US011247580B2

(12) United States Patent
Choi et al.

(10) Patent No.: US 11,247,580 B2
(45) Date of Patent: Feb. 15, 2022

(54) APPARATUS AND METHOD FOR PREDICTING FAILURE OF ELECTRIC CAR CHARGER

(71) Applicant: LG ELECTRONICS INC., Seoul (KR)

(72) Inventors: Hwanseok Choi, Seoul (KR); Jongseo Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 103 days.

(21) Appl. No.: 16/818,929

(22) Filed: Mar. 13, 2020

(65) Prior Publication Data

US 2021/0101502 A1 Apr. 8, 2021

(30) Foreign Application Priority Data

Oct. 8, 2019 (KR) .................. 10-2019-0124300

(51) Int. Cl.
*B60L 53/68* (2019.01)
*G06N 20/00* (2019.01)
*H02J 7/00* (2006.01)
*B60L 53/66* (2019.01)

(52) U.S. Cl.
CPC ............. *B60L 53/68* (2019.02); *B60L 53/66* (2019.02); *G06N 20/00* (2019.01); *H02J 7/007188* (2020.01)

(58) Field of Classification Search
CPC .......... B60L 53/68; B60L 53/66; B60L 53/60; G06N 20/00; G06N 3/08; H02J 7/007188; H02J 7/0047; H02J 2310/48; H02J 7/00034; Y02T 90/16; Y02T 90/167; Y02T 10/7072; Y02T 90/12; Y02T 10/70; Y04S 30/12; G06Q 50/30; G01W 1/00
See application file for complete search history.

(56) References Cited

U.S. PATENT DOCUMENTS

| 9,592,742 | B1* | 3/2017 | Sosinov | ................. | H02J 50/10 |
| 2015/0102775 | A1* | 4/2015 | Von Novak, III | ...... | B60L 53/14 320/109 |
| 2017/0308802 | A1* | 10/2017 | Ramsoy | ................. | G06N 20/10 |
| 2018/0373233 | A1* | 12/2018 | Goto | ................. | G05B 23/0229 |
| 2019/0283761 | A1* | 9/2019 | Bielby | ............... | G06K 9/00845 |
| 2020/0012753 | A1* | 1/2020 | Yokoyama | .............. | G06F 30/20 |
| 2020/0162487 | A1* | 5/2020 | Hong | ................. | H04L 63/1416 |
| 2021/0221247 | A1* | 7/2021 | Daniel | .............. | H02J 13/00002 |

* cited by examiner

*Primary Examiner* — Nha T Nguyen
(74) *Attorney, Agent, or Firm* — Lee, Hong, Degerman, Kang & Waimey PC

(57) ABSTRACT

An apparatus and method of predicting failure of an electric car charger that takes an environment around an electric car charger as input using an artificial intelligence technology are proposed. A method of operating an electronic apparatus that predicts failure of an electric car charger may include: acquiring sensor data measured by a sensor; acquiring area information showing an area of the first electric car charger; acquiring weather information at a point in time when the sensor data at the area was measured; creating a failure prediction model based on an artificial neural network; creating learning data; training the failure prediction model on the basis of the learning data; creating input data; acquiring a result about the operation state of the first electric car charger; and predicting possibility of failure of the first electric car charger on the basis of the result.

20 Claims, 6 Drawing Sheets

| TIMESTAMP | INTERNAL WATER LEVEL | INTERNAL TEMPERATURE | HUMIDITY | AREA | SKY STATE | PRECIPITATION AMOUNT | SNOWFALL AMOUNT | ATMOSPHERIC TEMPERATURE |
|---|---|---|---|---|---|---|---|---|

FIG. 4

APPARATUS AND METHOD FOR PREDICTING FAILURE OF ELECTRIC CAR CHARGER

CROSS REFERENCE TO RELATED APPLICATION

Pursuant to 35 U.S.C. § 119(a), this application claims the benefit of earlier filing date and right of priority to Korean Patent Application No. 10-2019-0124300, filed Oct. 8, 2019, the contents of which are all hereby incorporated by reference herein in their entirety.

BACKGROUND

Electric vehicles are increasingly popularized all over the world including the domestic market due to environment protection, etc., so electric car chargers are also increasingly installed.

Electric car chargers exposed to the external environment may malfunction or break down due to reasons such as snow, rain, and intense heat. Accordingly, many chargers are left broken down and cause inconvenience to the users of electric cars. Further, even if users of electric cars are provided current operation information that an electric car charger is available and go to the charger, the charger is actually broken down and they have to find another charger in some cases.

In order to solve these problems, there is a "Trouble diagnosis and management system for electrical vehicle charger" (Korean Patent application No. 10-2017-0109147), which collects failure information and provides the information to users in real time when a charger is determined as being in failure using an electric vehicle charger diagnosis tool. Further, there is an "electric vehicle charger diagnosis system and charger equipped with diagnosis system" (Korean Patent application No. 10-2015-0097434) in which an electric vehicle charger can be efficiently operated by accurately finding out the state of the charger through a diagnosis system in the electric vehicle charger.

SUMMARY

Patents of the related art provide plans that dispose a separate diagnosis device in a charger or connect a separate diagnosis device to a charger, accurately find out state information about the electric vehicle charger, and provide the found state information to users of electric vehicles, so it is possible to provide accurate failure information. However, an electric car charger that is broken down is left for a long period time before it is repaired, so it is required to prevent failure through pre-examination by predict failure.

Various embodiments relate to an apparatus and method for predicting failure of an electric car charger and, more particularly to an apparatus and method for predicting failure of an electric car charger by taking the environment around the electric car as input using artificial intelligence technology.

Various embodiments of the present disclosure can provide an apparatus and method for predicting failure of an electric car charger, the apparatus and method being equipped with an artificial intelligence technology that generates a failure prediction model for an electric car charger using an artificial neural network and predicts generation of failure using the failure prediction model.

The objects to implement in the present disclosure are not limited to the technical problems described above and other objects that are not stated herein will be clearly understood by those skilled in the art from the following specifications.

According to various embodiments of the present Disclosure, an electronic apparatus for predicting failure of an electric car charger includes: a communication unit performing data communication with an external device; an input unit and an output unit providing interfaces with a user; a memory; and at least one processor operationally connected with the communication unit, the input unit, the output unit, and the memory, in which the at least one processor: acquires sensor data measured by a sensor of a first electric car charger through the communication unit; acquires area information showing an area where the first electric car charger is located and weather information at a point in time when the sensor data at the area was measured; creates a failure prediction model based on an artificial neural network that takes the sensor data, the area information, and the weather information as input variables and takes an operation state of an electric car charger as an output variable; creates learning data based on the sensor data, the area information, and the weather information collected in the past; trains the failure prediction model on the basis of the learning data; creates input data on the basis of the acquired sensor data, area information, and weather information; acquires a result about the operation state of the first electric car charger by inputting the created input data to the trained failure prediction model; and predicts possibility of failure of the first electric car charger on the basis of the result.

According to various embodiments, a method of operating an electronic apparatus that predicts failure of an electric car charger includes: acquiring sensor data measured by a sensor of a first electric car charger; acquiring area information showing an area where the first electric car charger is located; acquiring weather information at a point in time when the sensor data at the area was measured; creating a failure prediction model based on an artificial neural network taking the sensor data, the area information, and the weather information as input variables and taking an operation state of an electric car charger as an output variable; creating learning data based on the sensor data, the area information, and the weather information collected in the past; training the failure prediction model on the basis of the learning data; creating input data on the basis of the acquired sensor data, area information, and weather information; acquiring a result about the operation state of the first electric car charger by inputting the created input data to the trained failure prediction model; and predicting possibility of failure of the first electric car charger on the basis of the result.

According to various embodiments, it is possible to prevent failure of an electric car charger by predicting possibility of failure of the electric car charger and performing pre-examination on the electric car charger having possibility of failure.

According to various embodiments, when possibility of failure is predicted but pre-examination is difficult to perform, operation of a corresponding electric car charger is stopped and then whether charging is possible in current operation information provided to an electric car user is updated as unavailable, thereby being able to prevent failure during charging.

The effects of the present disclosure are not limited to the effects described above and other effects can be clearly understood by those skilled in the art from the following description.

BRIEF DESCRIPTION OF THE DRAWINGS

FIG. 4 is a diagram showing a row constituting data of each electric car charger.

In the description of drawings, the same or similar components may be given the same or similar reference numerals.

DETAILED DESCRIPTION OF THE EMBODIMENTS

Figure 1:
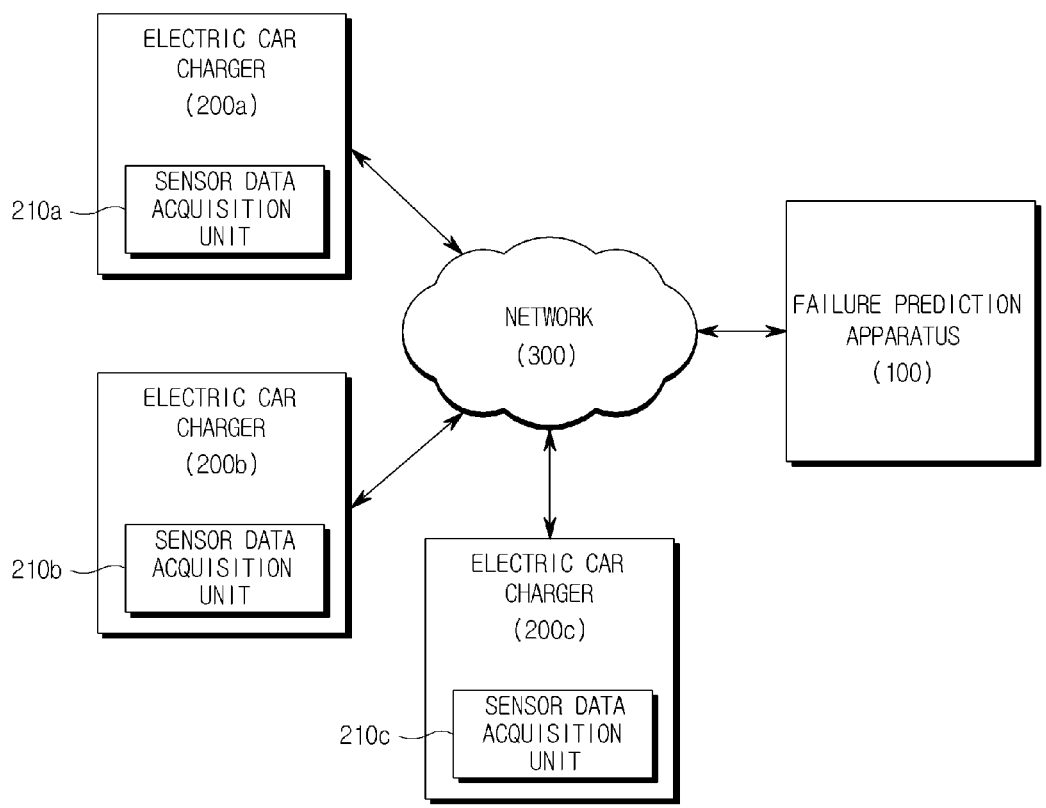
FIG. 1 is a diagram showing an apparatus for predicting failure of an electric car charger according to various embodiments.

Hereafter, embodiments of the present disclosure will be described in detail with reference to the accompanying drawings and the same or similar components are given the same reference numerals regardless of the numbers of figures and are not repeatedly described. Terms "module" and "unit" that are used for components in the following description are used only for the convenience of description without having discriminate meanings or functions. In the following description, if it is decided that the detailed description of known technologies related to the present Disclosure makes the subject matter of the embodiments described herein unclear, the detailed description is omitted. Terms "module" and "unit" that are used for components in the following description are used only for the convenience of description without having discriminate meanings or functions.

Terms including ordinal numbers such as 'first", "second", etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Artificial intelligence means a field that studies artificial intelligence or methodology that can achieve the artificial intelligence and machine learning means a field that studies methodology that defines various problems in the field of artificial intelligence and solves the problems. Machine learning is also defined as an algorithm that increases performance for tasks through continuous experiences.

An Artificial Neural Network (ANN), which is a model that is used in machine learning, may mean a general model that is composed of artificial neurons (node) forming a network by coupling synapses and has an ability to solve problems. An ANN may be defined by connection patterns among neurons in different layers, a learning process that updates model parameters, and an activation function that creates output values.

An ANN may include an input layer, an output layer, and one or more selective hidden layers. Each of the layers may include one or more neurons and the ANN may include synapses connecting neurons. The neurons in an ANN can output input signals, weights, and function values of the activation function about bias that are input through the synapses.

The model parameters are parameters that are determined through learning and include weights of synapse connection, bias of neurons, etc. Further, hyper-parameters, which are parameters that have to be set before learning in a machine learning algorithm, may include a learning rate, the number of times of repetition, a mini-batch size, an initialization function, etc.

The object of training an ANN may be considered as determining model parameters that minimize a loss function. The loss function can be used for an index for determining an optimum model parameter in a training process of an ANN.

Machine learning can be classified into supervised learning, unsupervised learning, and reinforcement learning in accordance with the type of learning.

Supervised learning is a method that trains an ANN with labels given to learning data, in which the label may be a correct answer (or a resultant value) that the ANN has to infer when learning data are input to the ANN. Unsupervised learning may be a method of training an ANN without a label given to learning data. Reinforcement learning may be a method of training an agent defined in a certain environment to select activities or an activity order that maximizes accumulated compensation in each state.

Machine learning that is achieved through a Deep Neural Network (DNN) including a plurality of hidden layers of ANNs is also called deep learning, which is one of machine learning. Hereafter, machine learning may be used as the meaning of deep learning.

FIG. 1 is a diagram showing an apparatus for predicting failure of an electric car charger according to various embodiments.

Referring to FIG. 1, in an apparatus for predicting failure of an electric car charger according to various embodiments, an electronic apparatus 100 that predicts failure of an electric car charger and at least one electric car charger 200a, 200b, and 200c may be connected to a network 300.

The network 300 may be any network that enables a device and another device to exchange data through communication. As an embodiment, the network 300 may be a Local Area Network (LAN) and may be a 3G network, a 4G or Long Term Evolution (LTE) network, or a 5G or Next Generation (NG) network.

The electric car chargers 200a, 200b, and 200c are devices for charging electric cars, and a plurality of electric car chargers may be installed at one site or may be installed sites far from each other. The electric car chargers 200a, 200b, and 200c respectively include sensor data acquirers 210a, 210b, and 210c each including a sensor, and can acquire and transmit information about a surrounding environment or information about their states to the electronic apparatus 100 through the network 300.

The sensor data acquirers 210a, 210b, and 210c of the electric car chargers 200a, 200b, and 200c can periodically read out values of sensors including an internal level sensor, an internal temperature sensor, and a humidity sensor mounted on them, and can transmit the read values together with the IDs of the chargers and timestamps when the sensor values were read out to the electronic apparatus 100 for predicting failure.

The method of transmitting the sensor data acquired from the electric car chargers 200a, 200b, and 200c to the electronic apparatus 100 may be varied. As an embodiment, it is possible to transmit data at every period when sensor values are acquired. As another embodiment, it may be possible to accumulate and then transmit data of several periods at a time in order to reduce the number of times of transmission. As another embodiment, it may be possible to accumulate and then transmit data at a time only when transmission fails while transmitting data at every period. As another embodiment, it may be possible to accumulate and then transmit data of a plurality of electric car chargers through a relay system that collects data of a plurality of electric car chargers at one electric car charge station, that is, at the same site.

Depending on embodiments, the electric car chargers 200a, 200b, and 200c may include a communication unit (not shown) that can transmit/receive data by connecting to the network 300.

The electronic apparatus 100 is a device for predicting failure of the electric car chargers 200a, 200b, and 200c connected to the network 300. The electronic apparatus 100 can predict failure of the electric car chargers 200a, 200b, and 200c using the artificial intelligence technology by using environment information and state information of the electric car chargers 200a, 200b, and 200c, weather information of the site where the electric car chargers 200a, 200b, and 200c are located, etc. as input variables.

The electronic apparatus 100, for example, may be a server located at a remote place. As another example, the electronic apparatus 100 may be a server or a computer at the same site where the electric car chargers 200a, 200b, and 200c are located, and in this case, the electronic apparatus 100 can predict failure of the electric car chargers positioned at the site.

Figure 2:
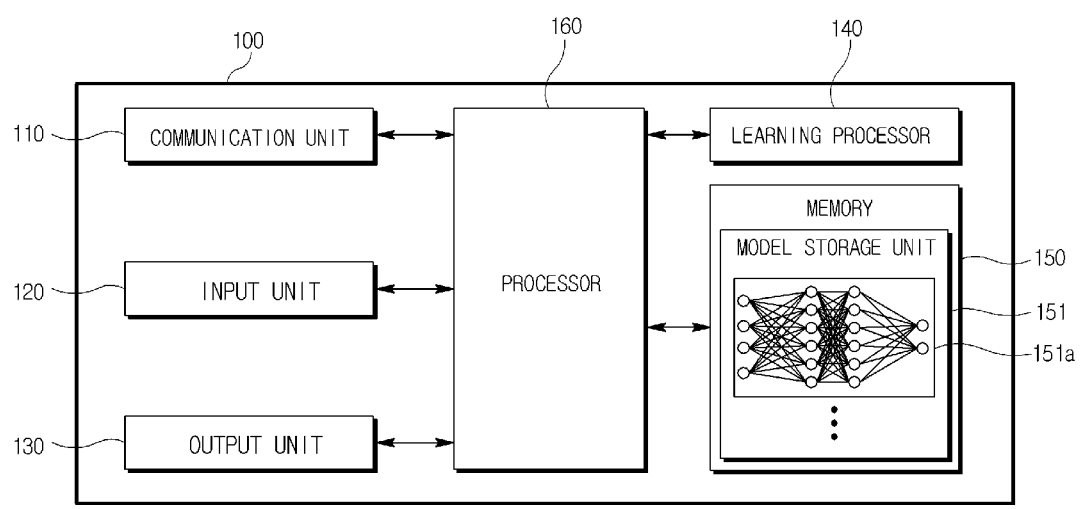
FIG. 2 is a block diagram an electronic apparatus that predicts failure of an electric car charger according to various embodiments.

FIG. 2 is a block diagram the electronic apparatus 100 that predicts failure of an electric car charger according to various embodiments. The block diagram of FIG. 2 is an example briefly showing components for the electronic apparatus 100 to predict failure of an electric car charger, and some of the components may be omitted and other components not shown in the figure may be added, depending on embodiments. Some of the components may be integrated in one chip and each component may be divided into a plurality of chips or circuits.

Referring to FIG. 2, the electronic apparatus 100 may include a communication unit 110, an input unit 120, an output unit 130, a learning processor 140, a memory 150, and a processor 160.

The communication unit 110 can transmit/receive data to/from the electric car chargers 200a, 200b, and 200c through the network 300 using a wire/wireless communication technology. For example, the communication unit 110 can acquire sensor data, which the electric car chargers 200a, 200b, and 200c have acquired, through the network 300. The communication unit 110 can also acquire weather information of the area where the electric car chargers 200a, 200b, and 200c are located by connecting to a weather server (not shown) through the network 300 or a specific network.

The communication unit 110 can use a wireless communication technology including Global System for Mobile (GSM) communication, Code Division Multi Access (CDMA), Long Term Evolution (LTE), 5G, Wireless LAN (WLAN), and Wireless-Fidelity (Wi-Fi) or a wire communication technology including Local Area Network (LAN), Wide Area Network (WAN), and Metropolitan Area Network (MAN).

The input unit 120 can acquire various kinds of data. The input unit 120 may include a camera for inputting image signals, a microphone for receiving audio signals, and a user input unit for receiving information from a user. The camera or the microphone may be considered as a kind of sensor and signals acquired from the camera or the microphone may be considered as sensing data or sensor information.

The input unit 120 can acquire commands for managing and controlling the electronic apparatus 100 from a user. The input unit 120 can acquire learning data for training parameters and models for configuring an artificial neural network model on the basis of provision from a user or commands from a user. The input unit 120 may acquire non-processed learning data, and in this case, the processor 160 or the learning processor 140 can extract input feature points as pre-processing for the learning data.

The output unit 130 can generate output related to the sense of sight, the sense of hearing, the sense of touch, or the like. The output unit 130 may include a display that outputs visual information, a speaker that outputs aural information, a haptic module that outputs tactual information, etc.

The learning processor 140 can train a model 151a configured as an artificial neural network using learning data. The trained artificial neural network may be referred to as a trained model. The trained model may be implemented by hardware, software, or a combination thereof. The trained model can be used to infer resultant values for new input data rather than learning data and the inferred values can be used as a basis of determination for performing certain operations.

Depending on various embodiments, the learning processor 140 may be integrated with the processor 160 of the electronic apparatus 100 into one chip. The trained models that are executed in the learning processor 140 may be implemented by hardware, software, and a combination of them. When some or all of learning data is implemented as software, one or more instructions constituting the learning data may be stored in the memory 150, an external memory directly connected to the electronic apparatus 100, or a memory maintained in an external device. The learning processor 140 can execute artificial intelligence processing programs by reading out and executing corresponding instructions from the memory.

The memory 150 can store data that support various functions of the electronic apparatus 100. For example, the memory 150 can store sensor data acquired from the electric car chargers 200a, 200b, and 200c, weather information acquired from a weather server, learning data acquired from the input unit 120, a trained model, a learning history, instructions for the learning processor 140, instructions for the processor 160, a model (or an artificial neural network) that has been trained or is being trained through the learning processor 140, etc. Some of the information may have been stored in the type of a database in the memory 150.

The processor 160 can determine at least one executable operation of the electronic apparatus on the basis of information determined or created using a data analysis algorithm or a machine learning algorithm. The processor 160 can perform operations determined by controlling the components of the electronic apparatus 100. Programs that are used when the processor 160 is operated may have been stored in the memory 150.

The processor 160 can request, search for, receive, or use data of the learning processor 140 or the memory 150, and can control the components of the electronic apparatus 100 to perform predicted operations or operations determined as being preferable of at least one executable operation.

When it is required to connect to an external device in order to perform a determined operation, the processor 160 can generate a control signal for controlling the external device and can transmit the generated control signal to the external device.

The processor 160 can acquire intention information for user input acquired through the input unit 120 and can determine the requirement of the user on the basis of the acquired intention information.

As an embodiment, the processor 160 can acquire intention information corresponding to user input using at least one of a Speech-To-Text (STT) engine for converting voice input into a character string and a Natural Language Processing (NLP) engine for acquiring the intention information of a natural language. At least one or more of the STT engine or the NLP engine may be an ANN at least partially trained in accordance with a machine learning algorithm. Further, at least one or more of the STT engine or the NLP engine may be trained by the learning processor 140.

The processor 160 can collect and store history information including operational details of the electronic apparatus 100 or user's feedback about the operations in the memory 150 or the learning processor 140. The collected history information can be used to update a trained model.

The processor 160 can control at least some of the components of the electronic apparatus 100 to execute the application programs stored in the memory 150. The processor 160 can combine and operate at least two or more of the components included in the electronic apparatus 100 to execute the application programs.

Figure 3:
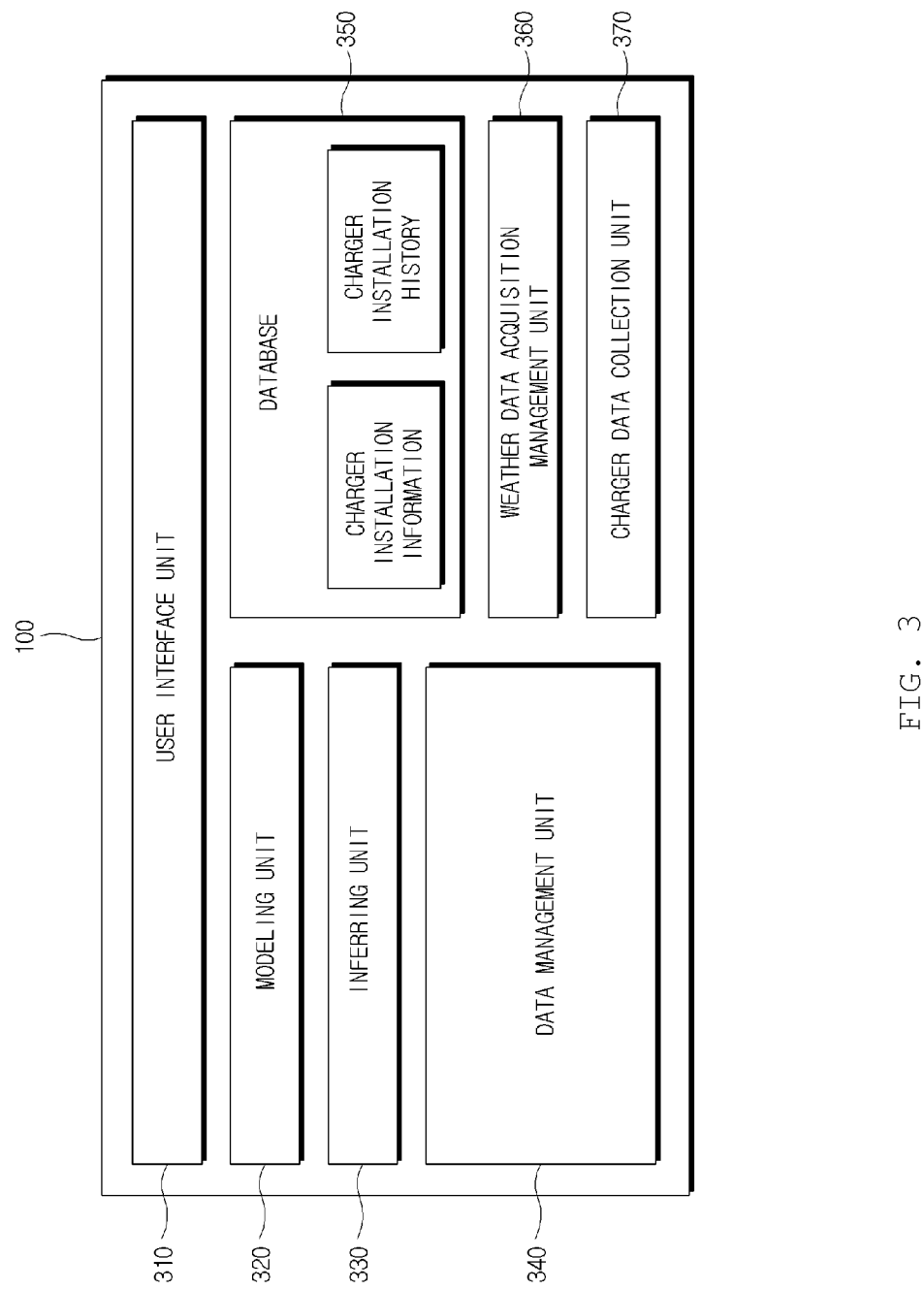
FIG. 3 is a block diagram showing programs that are executed by a processor and/or a learning processor of an electronic apparatus to predict failure of an electric car charger in accordance with various embodiments.

FIG. 3 is a block diagram showing programs that are executed by the processor 160 and/or the learning processor 140 of the electronic apparatus 100 to predict failure of an electric car charger in accordance with various embodiments. The block diagram of FIG. 3 is an example briefly showing software components for the electronic apparatus 100 to predict failure of an electric car charger, and some of the components may be omitted and other components not shown in the figure may be added, depending on embodiments. Further, some of the components may be integrated or each of the components may be divided into a plurality of components. The components shown in FIG. 3 may be implemented as separate programs or some of the components may be implemented in close connection with each other as one program.

Referring to FIG. 3, the electronic apparatus 100 for predicting failure of an electric car charger may include a user interface unit 310, a modeling unit 320, an inferring unit 330, a data management unit 340, a weather data acquisition management unit 360, and a charger data collection unit 370.

According to various embodiments, the charger data collection unit 370 can collect sensor data measured by each electric car charger. The charger data collection unit 370 may be connected to each electric car charger through the communication unit 110 and can collect sensor data of each electric car charger by acquiring sensor data acquired by the sensor data acquirer of each electric car charger through the communication unit 110. The sensor data may include a level sensor value, an internal temperature value, and a humidity value of corresponding chargers. The charger data collection unit 370 can acquire the sensor data described above together with IDs for identifying corresponding electric car chargers and the timestamps when the sensor data are acquired, from each electric car charger. The sensor data may be acquired from the electric car chargers at predetermined periods. The way of acquiring sensor data from electric car chargers by the charger data collection unit 370 may be various. According to an embodiment, the charger data collection unit 370 can receive sensor data through the communication unit 110 at every period for acquiring sensor values from the electric car chargers. The periods of acquiring sensor values of the electric car chargers may be different. According to another embodiment, the periods of acquiring sensor values of the electric car chargers are the same, but the period of times of acquiring the sensor values may be different. According to an embodiment, the charger data collection unit 370 can receive at a time accumulated sensor data acquired at several periods through the communication unit 110 to reduce the number of times of transmission. According to another embodiment, the charger data collection unit 370 may receive accumulated data only when transmission fails while receiving sensor data at every period for acquiring sensor values. According to another embodiment, the charger data collection unit 370 may receive and acquire at a time sensor data about a plurality of electric car chargers at one electric car charge station using an external relay system. According to another embodiment, the electric car charger may accumulate acquired sensor data, and may transmit the sensor data only when there is a request from the charger data collection unit 370.

The charger data collection unit 370 can transmit the sensor data received from each electric car charger to the data management unit 340.

According to various embodiments, the weather data acquisition management unit 360 can periodically acquire weather information of the area where an electric car charger is installed, using a weather API, and can manage the weather information. The acquisition period of weather data can be selected in consideration of the weather update period of the weather API that is used. The weather data acquisition management unit 360 may configure a table for each area using a DBMS to manage weather information and may use a method of storing data in a simple file type by configuring a file for each area. Each row that is stored may be composed of a start timestamp when corresponding weather information is available, an end timestamp when corresponding weather information is available, and values numerically expressing weather information (a sky state, a precipitation amount, a snowfall amount, and an atmospheric temperature).

When the sky state is briefly expressed, it may include a state of "clear", "partly cloudy", "mostly cloudy", "cloudy", "rainy", "snowy", or "rainy/snowy". When the sky state is expressed in detail, it may include the intensity and degree in detail such as the degree of cloud, light rain, heavy rain, light thunder/lightning, heavy thunder/lightning, light snow, and heavy snow.

The weather data acquisition management unit 360 receives values numerically expressing area information and timestamps from the data management unit 340, and when receiving a request for weather information, it can search for and provide weather information of the corresponding area at the point in time from the weather data that is currently managed.

According to various embodiments, the weather data acquisition management unit 360 may be connected with an external weather server through the communication unit 110 and can acquire weather data through the communication unit 110.

According to various embodiments, the data management unit 340 can store and manage data of each electric car charger. To this end, the data management unit 340 may use a Database Management System (DBMS) and may store and manage data in a simple file type. According to an embodiment, when using a DBMS, the data management unit 340 may configure a table for each electric car charger and then configure an internal level sensor value, an internal temperature sensor value, a humidity sensor value, values numerically expressing area information at a place where a corresponding charger is installed, and values numerically expressing weather information (a sky state, a precipitation amount, a snowfall amount, and an atmospheric temperature) at the area where a corresponding charger is installed in one row. When the sky state is briefly expressed, it may include a state of "clear", "partly cloudy", "mostly cloudy", "cloudy", "rainy", "snowy", or "rainy/snowy".

According to another embodiment, when not using a DBMS, the data management unit 340 can store and manage data in the same way as when using a DBMS, by configuring a file for each electric car charger.

FIG. 4 is a diagram showing a row constituting data of each electric car charger. Weather information at a place where a corresponding electric car charger is installed and weather information of the area are required to configure each row. The data management unit 340 can acquire the area information by searching for the ID of a corresponding charger from the database 350 and can acquire the weather information of the area at a corresponding point in time by transmitting values numerically expressing the area and a timestamp to the weather data acquisition management unit 360.

According to various embodiments, the modeling unit 320 can create an electric car charger failure prediction model when there is a request from a manager or at a predetermined point in time. To this end, the modeling unit 320 can perform an operation of reading out accumulated data for each charger that the data management unit 340 manages. The modeling unit 320 can arrange the read-out data in order of time using timestamps and can convert the data into values between 0 and 1 by normalizing items except for the timestamps.

As an embodiment, the modeling unit 320 can perform normalization on the basis of the following Equation 1.

$$X_{normalized} = \frac{X_n - X_{min}}{X_{max} - X_{min}} \quad \text{[Equation 1]}$$

where $X_{normalized}$ is a normalized value, $X_{min}$ is the minimum value of a corresponding variable, $X_{max}$ the maximum value of a corresponding variable, $X_n$ is an actual data value before normalization.

The modeling unit 320 can convert the normalized data into time-series data within a predetermined time range and can use the time-series data as input variables for creating a failure prediction model. The modeling unit 320 can find out whether a charger normally operates at the last point in time in one time-series data from a failure history in a database and can use a value numerically expressing the found-out failure history as an output variable for creating a failure prediction model. According to an embodiment, the output variable may be the operation state of a charger, and when the output variable is 0, it means a normal operation, when the output variable is close to 1, it means failure, and the closer the output variable to 1, the higher the possibility of failure may be. According to an embodiment, the modeling unit 320 can create an electric car charger failure prediction model by setting an input variable and an output variable described above in a Deep Neural Network (DNN). When there is an existing model, the modeling unit 320 may create a new model using all of the accumulated data or may create a new model using only the data accumulated after the point in time when a model was most recently created.

Figure 5:
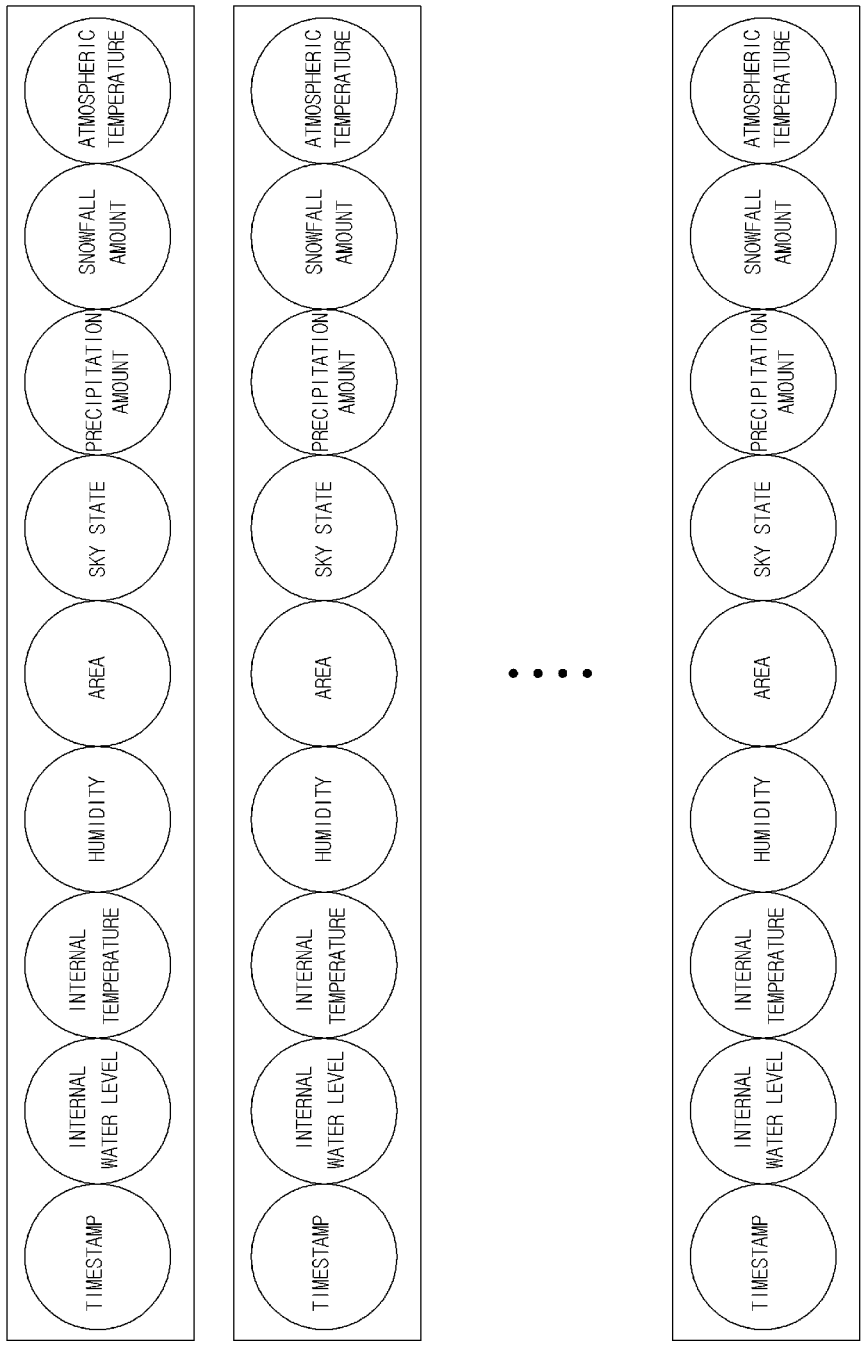
FIG. 5 is a diagram showing input variables for an electric car charger failure prediction model according to various embodiments.

FIG. 5 is a diagram showing input variables for an electric car charger failure prediction model according to various embodiments.

Referring to FIG. 5, input variables may include an internal water level value, an internal temperature value, and humidity that are sensor data acquired from an electric car charger, may include area information at a place where a corresponding electric car charger is located, and may include a sky state, a precipitation amount, a snowfall amount, and an atmospheric temperature that are weather information of the area where a corresponding electric car charger is located. The input variables may be expressed in a matrix in which those values collected for a predetermined time are arranged in time series. According to an embodiment, the input variables may have a value between 0 and 1 by being normalized in accordance with Equation 1. It is possible to determine whether the items of input variables that are used to create a model are appropriate on the basis of a charger installation guide, a charger examination result, etc. The government describes surrounding environments, which should be examined when a charger is installed, in an electric car charge infrastructure installation/operation guide. The guide includes a possibility of inundation due to rain and snow and whether it is a damp environment, etc. Further, according to monthly report of trend and statistics of electric vehicles (August, 2017) by Jeju Province in Korea, malfunction and failure due to continuous intense heat were shown in many chargers in wholesale examination of chargers enforced by Jeju Province and charger manufacturers. According to this result, it is determined as being reasonable to use an internal level, an internal temperature, humidity, an area, a sky state, a precipitation amount, a snowfall amount, and an atmospheric temperature as input variables that are used to create an artificial neural network mode because they are closely associated with failure of a charger.

According to various embodiments, the modeling unit 320 may be operated by the learning processor 140 or the processor 160.

According to various embodiments, the inferring unit 330 can perform inference for predicting failure of each electric car charger when there is a request from a manager or at a predetermined point in time. To this end, the inferring unit 330 can read out and converts recent data of the accumulated data for each electric car charger managed by the data management unit 340 into time-series data in the same type as the input variables used to create a model by the modeling unit 320. The inferring unit 330 can predict whether there is failure by applying the created time-series data to the trained failure prediction model created by the modeling unit 320. When a plurality of trained failure prediction models is used, the inferring unit 330 can acquire a final result by performing an ensemble on the result of each of the failure prediction models. According to an embodiment, when performing an ensemble on the result of each of a plurality of failure prediction models, the inferring unit 330 can calculate an average by applying a weight proportioned to the data size used to create each failure prediction model to the result of each failure prediction model. The inferring unit 330 can collect and transmit information of electric car chargers predicted to fail as the result of inference to the user interface unit 310.

According to various embodiments, the inferring unit 330 may be operated by the learning processor 140 or the processor 160.

According to various embodiments, the user interface unit 310 can provide an interface through which a manager can be given an instruction to create an electric car charger failure prediction model or can reserve a point in time for creation. The user interface unit 310 can provide an interface that enables a manager to give an instruction to perform failure prediction inference or to reserve performance of inference and an interface that collects information of electric car chargers predicted to fail and informs a manager of the information, using an existing model. The user interface unit 310 can provide an interface for failure prediction model creation history and information inquiry, and inference performance history and result inquiry and can provide an interface through which it is possible to inquire and update installation information and a failure history of an electric car charger.

The user interface unit 310 provides a list of electric car chargers predicted to fail to a manager, whereby the chargers can be examined in advance and failure can be prevented. As an embodiment, when it is determined to decrease an internal temperature, as the result of examining a charger, the user interface unit 310 can prevent failure of a charger by giving an instruction to control a chiller system operating with the charger to the manager or controlling the chiller system in person. As another embodiment, when it is required to stop the operation of a specific part due to replacement, etc., as the result of pre-examination, the user interface 310 updates the availability for charging of a corresponding charger into unavailable in a present electric car charger operation state information provided to an electric car charger, whereby it is possible to prevent a situation in which failure occurs while the electric car user charges the electric car after reaching a corresponding charger.

According to various embodiments, the user interface unit 310 can provide the interfaces described above to the manager or can receive commands from the manager using the input unit 120 and the output unit 130 of the electronic apparatus 100. The user interface 310 may provide the interfaces described above even to a remote manager, may receive commands from the manager, or may transmit commands for controlling an electric car charger to prevent failure by operating with the communication unit 110 of the electronic apparatus 100.

According to various embodiments, an electronic apparatus for predicting failure of an electric car charger (e.g., the failure prediction apparatus 100 of FIG. 1) includes: a communication unit (e.g., the communication unit 110 of FIG. 2) performing data communication with an external device; an input unit (e.g., the input unit 120 of FIG. 2) and an output unit (e.g., the output unit 130 of FIG. 2) providing interfaces with a user; a memory (e.g., the memory 150 of FIG. 2); and at least one processor (e.g., the processor 160 and/or the learning processor 14 of FIG. 2) operationally connected with the communication unit, the input unit, the output unit, and the memory, in which the at least one processor may acquire sensor data measured by a sensor of a first electric car charger through the communication unit, may acquire area information showing an area where the first electric car charger is located and weather information at a point in time when the sensor data at the area was measured, may create a failure prediction model based on an artificial neural network that takes the sensor data, the area information, and the weather information as input variables and takes an operation state of an electric car charger as an output variable, may create learning data based on the sensor data, the area information, and the weather information collected in the past, may train the failure prediction model on the basis of the learning data, may create input data on the basis of the acquired sensor data, area information, and weather information, may acquire a result about the operation state of the first electric car charger by inputting the created input data to the trained failure prediction model, and may predict possibility of failure of the first electric car charger on the basis of the result.

According to various embodiments, when possibility of failure of the first electric car charger is predicted, the at least one processor may transmit notification, which requests pre-examination, to a manager through the output unit or the communication unit.

According to various embodiments, the sensor data may include an internal level value, an internal temperature value, and a humidity value of an electric car charger and the weather information may include a sky state, a precipitation amount, a snowfall amount, and an atmospheric temperature.

According to various embodiments, the at least one processor may acquire and store a failure history of the first electric car charger in the memory, may create the learning data by arranging in time-series the internal level value, the internal temperature value, the humidity value, the area information, the sky state, the precipitation amount, the snowfall amount, and the atmospheric temperature for a first period of the internal level value, the internal temperature value, the humidity value, the area information, the sky state, the precipitation amount, the snowfall amount, and the atmospheric temperature that were collected in the past, and may create a label for training the failure prediction model on the basis of the failure history.

According to various embodiments, the at least one processor may normalize each variable of the learning data and the input data such that each variable has a value between 0 and 1.

According to various embodiments, the at least one processor may create a new failure prediction model at a predetermined time period or in accordance with a command from a user through the input unit.

According to various embodiments, the at least one processor may train the new failure prediction model on the basis of learning data based on all of the sensor data, the area information, and the weather information collected and stored in the memory in the past.

According to various embodiments, the at least one processor may train the new failure prediction model on the basis of learning data based on all of the sensor data, the area information, and the weather information collected and stored in the memory after a previous failure prediction model is created.

According to various embodiments, the at least one processor may create a plurality of failure prediction models, train the plurality of failure prediction models using different learning data, and predict possibility of failure of the first electric car charger by obtaining an ensemble for each result for the first electric car charger of the plurality of failure prediction models.

According to various embodiments, the at least one processor may predict possibility of failure of the first electric car charger by determining a weight proportioned to sizes of the difference learning data, applying the weight to each result for the operation state of the first electric car charger of the plurality of failure prediction models, and calculating an average.

According to various embodiments, the at least one processor may acquire sensor data measured from each of a plurality of electric car chargers including the first electric car charger, may acquire area information of each of the plurality of electric car chargers and weather information at a point in time when the sensor data at each of the area were measured, may store sensor data received from each the plurality of electric car chargers, area information where the electric car chargers from which the sensor data were measured are located, and weather information of the areas where the sensor data were measured in relation to each other in the memory, may acquire and store a failure history of each of the plurality of electric car chargers, and may train the failure prediction model by creating a plurality of learning data on the basis of the data stored in the memory for the plurality of electric car chargers for the first period.

As described above, the electronic apparatus for predicting failure of an electric car charger proposed in the present disclosure can predict failure of an electric car charger with considerable precision by using an artificial neural network model that takes sensor data measured from the electric car charger, and area information and weather information at a place where the electric car charger is located as input variables.

Figure 6:
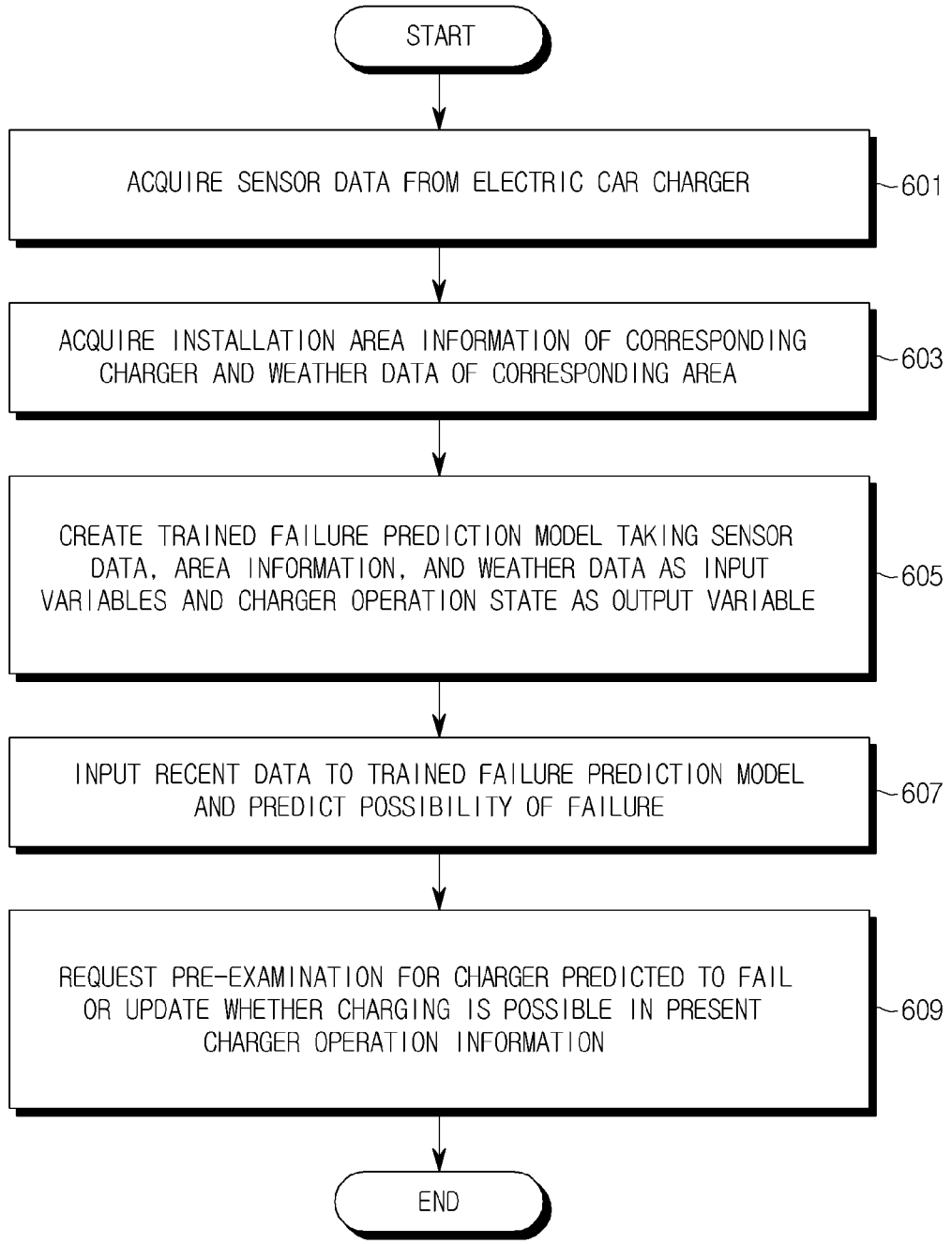
FIG. 6 is a flowchart showing a method of predicting failure of an electric car charger by an electronic apparatus according to various embodiments.

FIG. 6 is a flowchart showing a method of predicting failure of an electric car charger by the electronic apparatus 100 according to various embodiments.

Referring to FIG. 6, in operation 601, the electronic apparatus 100 can acquire sensor data from an electric car charger in accordance with a predetermined period. The sensor data may include an internal level value, an internal temperature value, and humidity. The electronic apparatus 100 can acquire an ID from which it is possible to identify an electric car charger, and a timestamp showing the point of time when the sensor data was measured, when receiving sensor data from the electric car charger. Therefore, according to an embodiment, the electronic apparatus 100 can acquire sensor data from a plurality of electric car charge rather than one electric car charger, and can determine which electric car chargers the sensor data correspond to using the IDs.

According to various embodiments, in operation 603, the electronic apparatus 100 can acquire area information of a place where a corresponding charger installed and weather information of the area in relation to the acquired sensor data. According to an embodiment, installation information of electric car chargers may be stored in a database and weather information of the area where an electric car charger is installed may be periodically taken and stored in the memory 150 or managed in a database. The electronic apparatus 100 can acquire the ID of an electric car charger transmitting sensor data and a timestamp that is time information when the sensor data were measured while acquiring the sensor data. Accordingly, the electronic apparatus 100 can acquire installation area information of the charger in the database on the basis of the acquired ID of the electric car charger. The electronic apparatus 100 can acquire weather information at the point in time when the sensor data were acquired from the database on the basis of the acquired timestamp and area information. According to various embodiments, the electronic apparatus 100 may acquire the weather information from an external weather server.

According to various embodiments, in operation 605, the electronic apparatus 100 can create a failure prediction model trained using sensor data, area information, and weather data as input variables and the operation state of a charger as an output variable. According to an embodiment, the failure prediction model may be an artificial neural network. Alternatively, the failure prediction model may be a Deep Neural Network (DNN) having a plurality of hidden nodes.

The electronic apparatus 100 may include an internal level, an internal temperature, humidity, and an installation area of an electric car charger acquired from the electric car charger for a predetermined time as input variables, and a sky state, a precipitation amount, a snowfall amount, and an atmospheric temperature that are weather data at the installation area of the electric car charger. As an embodiment, the sensor data may be measured every hour, and sensor data, area information, and weather information accumulated for one day, that is, sensor data, area information, and weather information measured every hour during twenty four hours may be used as input variables.

According to an embodiment, the electronic apparatus 100 can normalize the input variables such that they have a value between 0 and 1. As an embodiment, the electronic apparatus 100 may normalize the input variables in accordance with the above Equation 1 such that they have a value between 0 and 1.

According to an embodiment, the electronic apparatus 100 may produce input data on the basis of sensor data, area information, and weather information measured and stored in a database in the past, and may train a failure prediction model by producing learning data by creating resultant variables corresponding to input data on the basis of a charge failure history stored in a database, and then inputting the learning data into the failure prediction model. The learning data is not only produced from data related to specific electric car chargers, but may be produced using data related to all electric car chargers.

According to various embodiments, it is possible to create a new model in accordance with a command from a user or at a predetermined period. According to an embodiment, the learning data of the newly trained failure prediction model may be all of accumulated data. According to another embodiment, the learning data of the newly trained failure prediction model may be obtained by using only data accumulated after the point in time when a model was mostly recently created.

According to another embodiment, it is possible to create a plurality of trained failure prediction models. The plurality of trained failure prediction models may use the same input variables and output variables, but may be failure prediction models trained using different learning data.

According to various embodiments, in operation 607, the electronic apparatus 100 can predict failure generation possibility by inputting the most recent data into a trained failure prediction model. According to an embodiment, the electronic apparatus 100 can predict failure generation possibility of each electric car charger when there is a request from a manager or at a predetermined point in time. To this end, the electronic apparatus 100 can create input data in the same type as the learning data, which were used to train the failure prediction model in operation 605, by reading out the most recent data from the data accumulated in each electric car charger. When the input data is accumulated time-series data, the amount of the input data may be the same as that of the learning data. The input data may be given a value between 0 and 1 by normalizing the values stored in a database in accordance with Equation 1. The electronic apparatus 100 can predict possibility of failure by inputting the created input data to the trained failure prediction model created in operation 605.

According to an embodiment, when a plurality of trained failure prediction model is used, the electronic apparatus 100 can acquire a final result by performing an ensemble on the result of each of the failure prediction model. In addition, when performing an ensemble on the result of each of a plurality of failure prediction models, the inferring unit 100 can calculate an average by applying a weight proportioned to the size of the learning data used to create each failure prediction model to the result of each failure prediction model.

According to various embodiments, in operation 609, the electronic apparatus can request pre-examination for a charger predicted to fail or can update whether charging is possible in present charger operation information as unavailable.

As an embodiment, the electronic apparatus 100 can inform a manager of information of chargers predicted to fail by collecting and displaying the information on the user interface unit 310. As another embodiment, the electronic apparatus can transmit information of chargers predicted to fail to a device such as a mobile phone of a manager through the communication unit 110.

As another embodiment, when it is required to temporarily stop use of a charger predicted to fail, the electronic apparatus 100 can update whether charging is possible of the electric car charger as unavailable in the present electric car charger operation information that is provided to the user of an electric car.

By the operation of the electronic apparatus 100, whereby it is possible to prevent a situation in which failure occurs while the electric car user charges the electric car after reaching the electric car charger.

According to various embodiments, a method of operating an electronic apparatus that predicts failure of an electric car charger may include: acquiring sensor data measured by a sensor of a first electric car charger; acquiring area information showing an area where the first electric car charger is located; acquiring weather information at a point in time when the sensor data at the area was measured; creating a failure prediction model based on an artificial neural network that takes the sensor data, the area information, and the weather information as input variables and takes an operation state of an electric car charger as an output variable; creating learning data based on the sensor data, the area information, and the weather information collected in the past; training the failure prediction model on the basis of the learning data; creating input data on the basis of the acquired sensor data, area information, and weather information; acquiring a result about the operation state of the first electric car charger by inputting the created input data to the trained failure prediction model; and predicting possibility of failure of the first electric car charger on the basis of the result.

According to various embodiments, the method may further include transmitting notification, which requests pre-examination, to a manager when possibility of failure of the first electric car charger is predicted.

According to various embodiments, the sensor data may include an internal level value, an internal temperature value, and a humidity value of an electric car charger and the weather information may include a sky state, a precipitation amount, a snowfall amount, and an atmospheric temperature.

According to various embodiments, the method may further include acquiring and storing a failure history of the first electric car charger in a memory, in which the creating of learning data based on the sensor data, the area information, and the weather information that were collected in the past may include: creating learning data by arranging in time-series the internal level value, the internal temperature value, the humidity value, the area information, the sky state, the precipitation amount, the snowfall amount, and the atmospheric temperature for a first period of the internal level value, the internal temperature value, the humidity value, the area information, the sky state, the precipitation amount, the snowfall amount, and the atmospheric temperature that were collected in the past; and creating a label for training the failure prediction model on the basis of the failure history.

According to various embodiments, the method may further include normalizing each variable of the learning data and the input data such that each variable has a value between 0 and 1.

According to various embodiments, the method may further include creating a new failure prediction model in accordance with a command from a user or at a predetermined time period.

According to various embodiments, the method may further include training the new failure prediction model on the basis of learning data based on all of the sensor data, the area information, and the weather information collected and stored in the memory in the past.

According to various embodiments, the method may further include training the new failure prediction model on the basis of learning data based on all of the sensor data, the area information, and the weather information collected and stored in the memory after a previous failure prediction model is created.

According to various embodiments, the predicting of possibility of failure of the first electric car charger may include: determining a weight proportioned to size of learning data of each of the plurality of failure prediction model; and predicting possibility of failure of the first electric car charger by applying the weight to each result for the operation state of the first electric car charger of the plurality of failure prediction models, and calculating an average.

According to various embodiments, the method may further include: acquiring sensor data measured from each of a plurality of electric car chargers including the first electric car charger; acquiring area information of each of the plurality of electric car chargers and weather information at a point in time when the sensor data at each of the areas was measured; storing sensor data received from each the plurality of electric car chargers, area information where the electric car chargers from which the sensor data were measured are located, and weather information of the areas where the sensor data were measured in relation to each other in the memory; acquiring and storing a failure history of each of the plurality of electric car chargers, and training the failure prediction model by creating a plurality of learning data on the basis of the data stored in the memory for the plurality of electric car chargers for the first period.

The apparatus and method proposed in the present disclosure can prevent failure of an electric car charger by predicting and notifying possibility of failure of the electric car charger in advance using an artificial intelligence machine learning technology. Further, the apparatus and method can minimize an unnecessary waste of time and inconvenience of an electric car user by informing relevant matters of the electric car user.

What is claimed is:

1. An electronic apparatus for predicting failure of an electric car charger, the electronic apparatus comprising:
   a communication unit performing data communication with an external device;
   an input unit and an output unit providing interfaces with a user;
   a memory; and
   at least one processor operationally connected with the communication unit, the input unit, the output unit, and the memory,
   wherein the at least one processor acquires sensor data measured by a sensor of a first electric car charger through the communication unit,
   acquires area information showing an area where the first electric car charger is located and weather information of the area at a point in time when the sensor data was measured,
   creates a failure prediction model based on an artificial neural network that takes the sensor data, the area information, and the weather information as input variables and takes an operation state of an electric car charger as an output variable,
   creates learning data based on the sensor data, the area information, and the weather information collected in the past,
   trains the failure prediction model on the basis of the learning data,
   creates input data on the basis of the acquired sensor data, area information, and weather information,
   acquires a result about the operation state of the first electric car charger by inputting the created input data to the trained failure prediction model, and
   predicts possibility of failure of the first electric car charger on the basis of the result.

2. The electronic apparatus of claim 1, wherein when possibility of failure of the first electric car charger is predicted, the at least one processor transmits notification, which requests pre-examination, to a manager through the output unit or the communication unit.

3. The electronic apparatus of claim 1, wherein the sensor data includes an internal water level value, an internal temperature value, and a humidity value of an electric car charger and the weather information may include a sky state, a precipitation amount, a snowfall amount, and an atmospheric temperature.

4. The electronic apparatus of claim 3, wherein the at least one processor acquires and stores a failure history of the first electric car charger in the memory,
   creates the learning data by arranging in time-series the internal water level value, the internal temperature value, the humidity value, the area information, the sky state, the precipitation amount, the snowfall amount, and the atmospheric temperature for a first period among the internal water level value, the internal temperature value, the humidity value, the area information, the sky state, the precipitation amount, the snowfall amount, and the atmospheric temperature that were collected in the past, and
   creates a label for training the failure prediction model on the basis of the failure history.

5. The electronic apparatus of claim 4, wherein the at least one processor normalizes each variable of the learning data and the input data such that each variable has a value between 0 and 1.

6. The electronic apparatus of claim 4, wherein the at least one processor creates a new failure prediction model at a predetermined time period or in accordance with a command from a user through the input unit.

7. The electronic apparatus of claim 6, wherein the at least one processor trains the new failure prediction model on the basis of learning data based on all of the sensor data, the area information, and the weather information collected and stored in the memory after a previous failure prediction model is created.

8. The electronic apparatus of claim 4, wherein the at least one processor creates a plurality of failure prediction models,
   trains the plurality of failure prediction models using different learning data,
   determines weight for each failure prediction model proportioned to sizes of the difference learning data, and
   predicts possibility of failure of the first electric car charger by obtaining an ensemble for each result for the first electric car charger of the plurality of failure prediction models.

9. The electronic device of claim 8, wherein the at least one processor predicts possibility of failure of the first electric car charger by determining a weight proportioned to sizes of the difference learning data, applying the weight to each result for the operation state of the first electric car charger of the plurality of failure prediction models, and calculating an average.

10. The electronic apparatus of claim 4, wherein the at least one processor acquires sensor data measured from each of a plurality of electric car chargers including the first electric car charger,
    acquires area information of each of the plurality of electric car chargers and weather information at a point in time when the sensor data at each of the area were measured,
    stores sensor data received from each the plurality of electric car chargers, area information where the electric car chargers from which the sensor data were measured are located, and weather information of the areas where the sensor data were measured in relation to each other in the memory,
    acquires and stores a failure history of each of the plurality of electric car chargers, and
    trains the failure prediction model by creating a plurality of learning data on the basis of the data stored in the memory for the plurality of electric car chargers for the first period.

11. A method of operating an electronic apparatus that predicts failure of an electric car charger, the method comprising:
    acquiring sensor data measured by a sensor of a first electric car charger;
    acquiring area information showing an area where the first electric car charger is located;
    acquiring weather information of the area at a point in time when the sensor data was measured;
    creating a failure prediction model based on an artificial neural network that takes the sensor data, the area information, and the weather information as input variables and takes an operation state of an electric car charger as an output variable;

creating learning data based on the sensor data, the area information, and the weather information collected in the past;
training the failure prediction model on the basis of the learning data;
creating input data on the basis of the acquired sensor data, area information, and weather information;
acquiring a result about the operation state of the first electric car charger by inputting the created input data to the trained failure prediction model; and
predicting possibility of failure of the first electric car charger on the basis of the result.

12. The method of claim 11, further comprising transmitting notification, which requests pre-examination, to a manager when possibility of failure of the first electric car charger is predicted.

13. The method of claim 11, wherein the sensor data includes an internal water level value, an internal temperature value, and a humidity value of an electric car charger and the weather information may include a sky state, a precipitation amount, a snowfall amount, and an atmospheric temperature.

14. The method of claim 13, further comprising acquiring and storing a failure history of the first electric car charger in a memory,
wherein the creating of learning data based on the sensor data, the area information, and the weather information that were collected in the past includes:
creating learning data by arranging in time-series the internal water level value, the internal temperature value, the humidity value, the area information, the sky state, the precipitation amount, the snowfall amount, and the atmospheric temperature for a first period among the internal water level value, the internal temperature value, the humidity value, the area information, the sky state, the precipitation amount, the snowfall amount, and the atmospheric temperature that were collected in the past; and
creating a label for training the failure prediction model on the basis of the failure history.

15. The method of claim 14, further comprising normalizing each variable of the learning data and the input data such that each variable has a value between 0 and 1.

16. The method of claim 14, further comprising creating a new failure prediction model in accordance with a command from a user or at a predetermined time period.

17. The method of claim 16, further comprising training the new failure prediction model on the basis of learning data based on all of the sensor data, the area information, and the weather information collected and stored in the memory after a previous failure prediction model is created.

18. The method of claim 14, wherein the creating of a failure prediction model includes creating a plurality of failure prediction models,
the creating of learning data includes creating learning data of the plurality of failure prediction models on the basis of the sensor data, the area information, and the weather information for different time periods of the sensor data, the area information, and the weather information that were collected in the past,
the acquiring of a result about the operation state of the first electric car charger includes acquiring a result about the operation state of the first electric car charger from each of the plurality of failure prediction models, and
the predicting of possibility of failure of the first electric car charger includes predicting possibility of failure of the first electric car charger by obtaining an ensemble for a result of each of the plurality of failure prediction models.

19. The method of claim 18, wherein the predicting of possibility of failure of the first electric car charger includes:
determining a weight proportioned to size of learning data of each of the plurality of failure prediction model; and
predicting possibility of failure of the first electric car charger by applying the weight to each result for the operation state of the first electric car charger of the plurality of failure prediction models, and calculating an average.

20. The method of claim 14, further comprising:
acquiring sensor data measured from each of a plurality of electric car chargers including the first electric car charger;
acquiring area information of each of the plurality of electric car chargers and weather information at a point in time when the sensor data at each of the area were measured;
storing sensor data received from each the plurality of electric car chargers, area information where the electric car chargers from which the sensor data were measured are located, and weather information of the areas where the sensor data were measured in relation to each other in the memory;
acquiring and storing a failure history of each of the plurality of electric car chargers, and
training the failure prediction model by creating a plurality of learning data on the basis of the data stored in the memory for the plurality of electric car chargers for the first period.

* * * * *